July 15, 1958 — W. J. WILLIAMS — 2,843,227
AUTOMATIC HYDRAULIC BRAKE SYSTEM
Filed May 9, 1955 — 3 Sheets-Sheet 1

INVENTOR.
WILLIS J. WILLIAMS
BY Carl Miller
ATTORNEY

July 15, 1958 W. J. WILLIAMS 2,843,227
AUTOMATIC HYDRAULIC BRAKE SYSTEM
Filed May 9, 1955 3 Sheets-Sheet 2
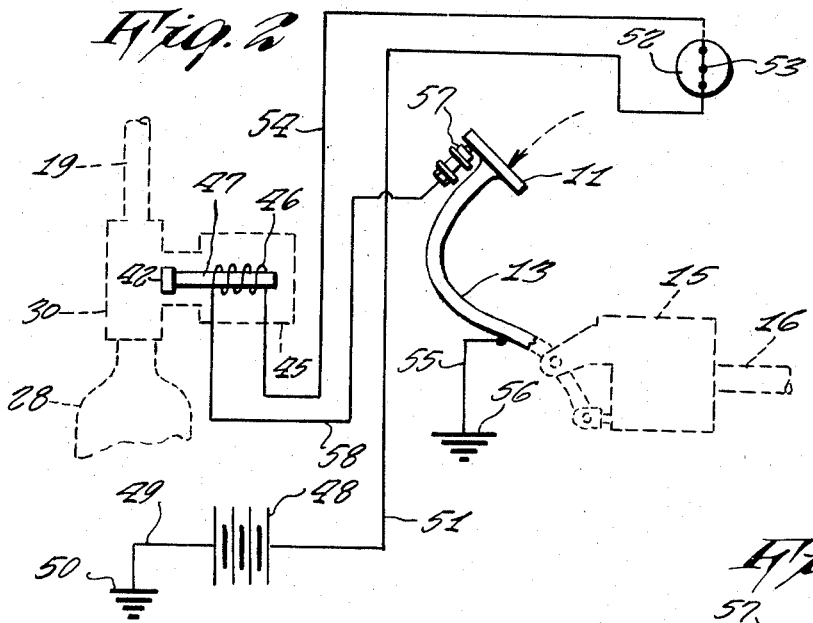
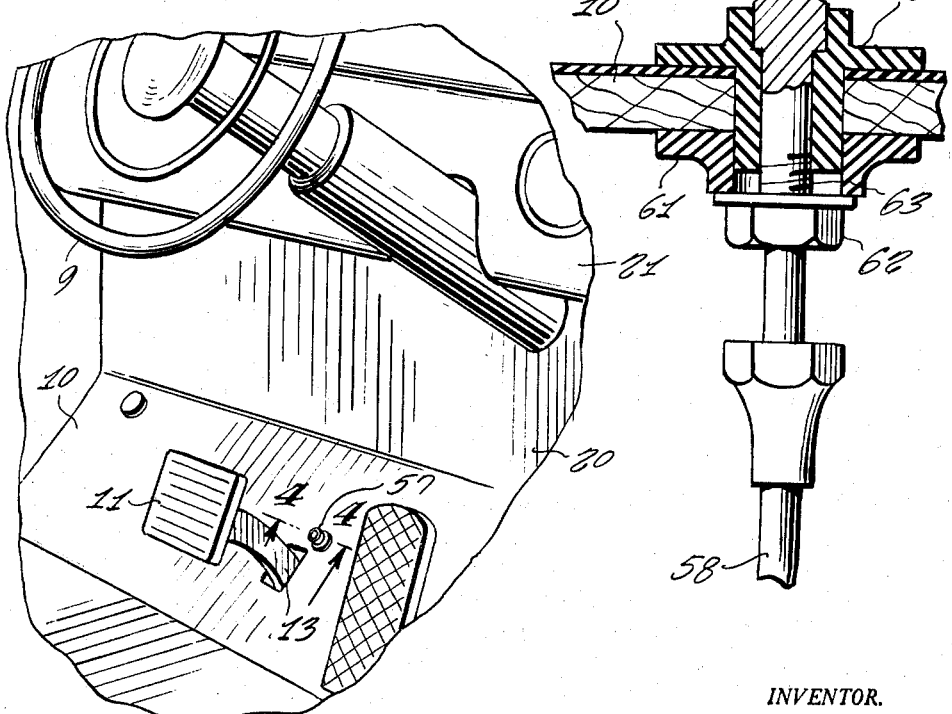
INVENTOR.
WILLIS J. WILLIAMS
BY
Carl Miller
ATTORNEY

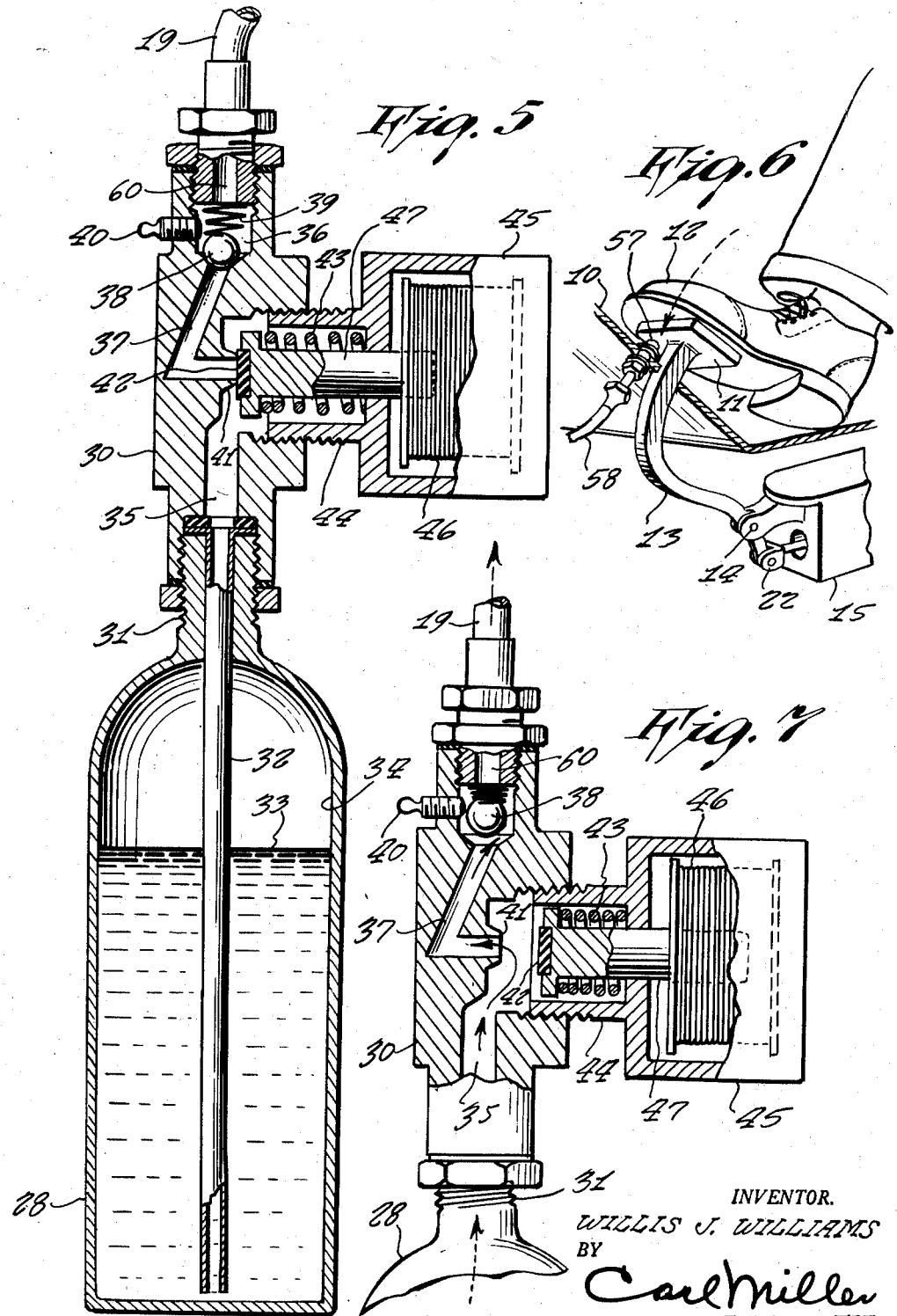

United States Patent Office 2,843,227
Patented July 15, 1958

2,843,227
AUTOMATIC HYDRAULIC BRAKE SYSTEM
Willis J. Williams, Jersey City, N. J.

Application May 9, 1955, Serial No. 506,789

1 Claim. (Cl. 188—152)

This invention relates to brakes for self-propelled vehicles and the like, and particularly to what I choose to term an automatic hydraulic brake system.

The main object of my invention is to provide an automobile with special means for stopping an automobile equipped with the invention when the brakes fail or when any wheel cylinder leaks.

Another object of the invention is to install special hydraulic means upon an automobile equipped with a foot pedal in order to take over stopping of the car when the foot brake is worn or otherwise inoperative so as to prevent accidents.

A further object is to have a pressure cylinder for liquids and gases connected to the hydraulic system of an automobile brake and provided with special valves for controlling the flow of brake fluid from the cylinder into the system when required for effecting braking of the car when anything goes wrong with the foot brake.

It is also an object to render a hydraulic brake system entirely safe and certain to operate.

A practical object is, of course to have a system of the character indicated that is reasonable in cost, easy to install and both simple and certain to operate.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which:

Figure 2 is a circuit diagram of the electrical features of the invention;

Figure 3 is another view of the invention as seen from the inside of the automobile;

Figure 4 is an enlarged sectional view as taken on line 4—4 in Figure 3;

Figure 5 is another sectional view on an enlarged scale as taken on line 5—5 in Figure 1;

Figure 6 is a partial perspective view of the operating parts also shown in Figure 1 with the foot brake depressed into active position; and Figure 7 is an enlarged fragmentary section of certain valve parts also shown in Figure 5 and illustrating the valves open.

Throughout the views, the same reference numerals indicate the same or like parts and features.

Figure 1:
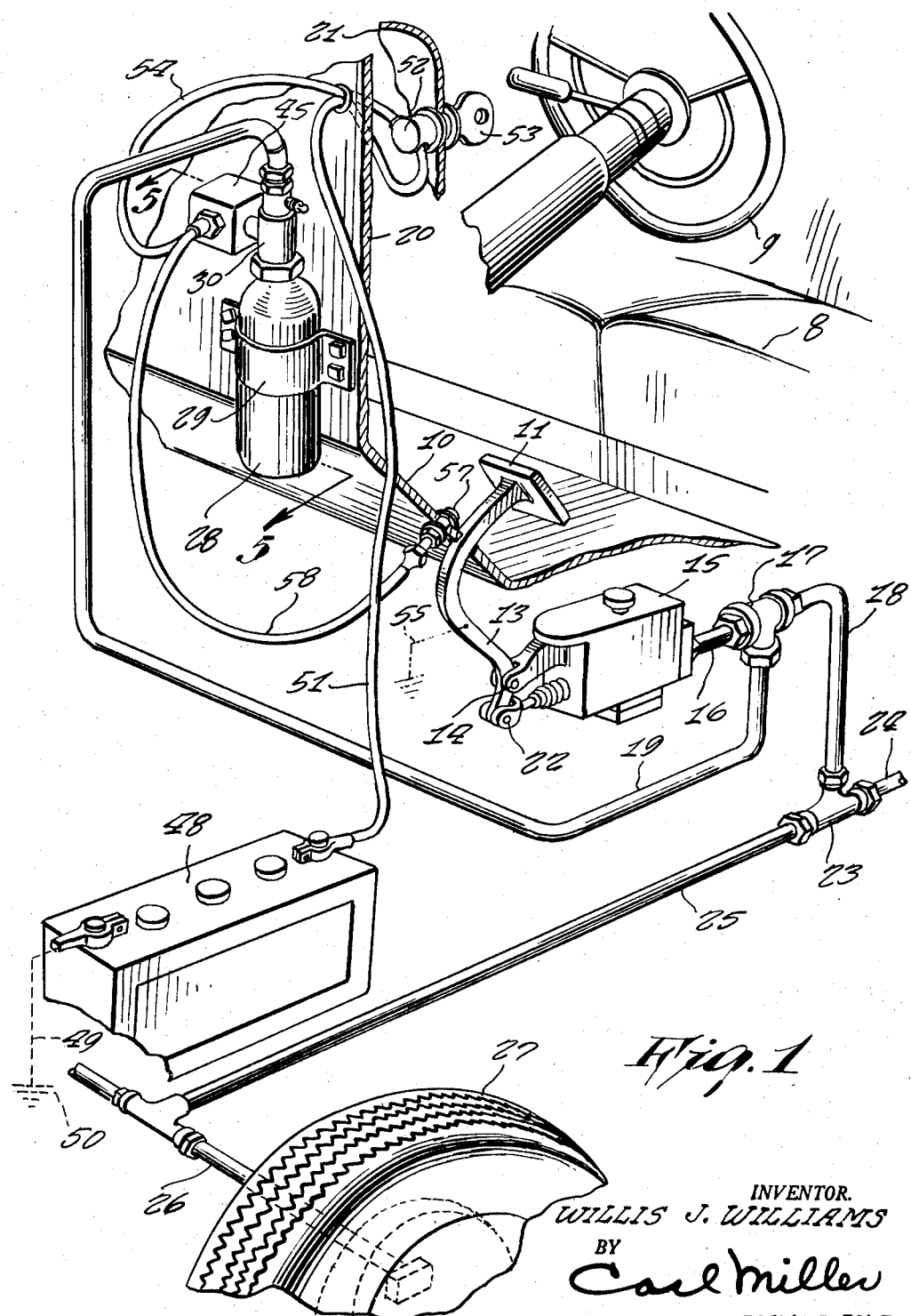
Figure 1 is a perspective view of the invention as installed in an automobile.

Motorists sometimes are dismayed to find in an emergency that their foot brakes will not operate properly, and the immediate result may often be an accident. This is even true of a hydraulic foot brake, which may fail for lack of fluid pressure, leakage, etc.

Upon considering this problem, it has occurred to me that a hydraulic brake system could well be fortified by a special means installed and connected to the system to supply brake fluid under independent pressure so as to compensate for pressure or fluid losses from the brake system, and ensure operation when required. As a result of such consideration, I have succeeded in producing a stop brake unit and system for hydraulic foot brakes along the lines already alluded to, and which will now be described in detail in the following.

Hence, in the practice of my invention, and referring also again to the drawings, the seat 8, wheel 9 and foot board 10 of an automobile are arranged to have the foot brake pedal 11 project inward toward the seat in effective position for an operator to press down the pedal by his foot 12 (Figure 6). The lever portion 13 of this pedal is fulcrumed at 14 upon the front end of a hydraulic valve casing or master cylinder 15 mounted beneath the foot board and containing a control valve (not shown) to pass hydraulic brake fluid into the brake system. The latter includes a pipe 16 connecting with a pipe T17 that in turn connects with a rear bent pipe 18 and a pressure supply pipe 19 that runs forwardly and upwards in front of the fire wall 20 beyond the dash board 21. The valve within the master cylinder 15 has a stem 22 by which it connects pivotally with the lower end of brake lever 13 to be operated by the brake pedal in normal conditions.

The mentioned pipe 18 extends down to a fore and aft T23 connecting with rear pipe 24 and front pipe 25. This latter pipe connects with the front wheel brakes pipe 26 for front wheels 27 (one shown), the rear pipe 24 connecting with the rear brake pipe and brakes (not shown), but similar to the front brake assembly, all of which may be more or less conventional.

However, to the fire wall 20 is secured a metal pressure gas and brake fluid container 28 by means of a bracket 29 having a valve casing 30 screwed upon the upper end or threaded neck 31 thereof. Within the container 28, the neck 31 has a tube 32 that extends into a quantity of brake fluid 33 (Figure 5), the space 34 above the mentioned fluid being occupied by an inert gas under heavy pressure in order to be capable of driving out the fluid through tube 32 when the passage 35 in valve casing 30 is open to allow such escape. At the top of this valve casing, it connects with the end of pipe 19 that communicates through T17 and pipe 16 with pedal operated valve casing 15 already mentioned, and especially with brake pipe 18 that feeds fluid to front and rear brake pipes 25 and 24.

Below the connection to pipe 19, casing 30 has a valve chamber 36 communicating with a downward passage 37 that is controlled by a ball valve 38 normally closing communication between this passage and chamber 36 under bias of a spring 39, while a stop screw 40 limits the upward movement of ball 38 when raised by fluid rising from passage 35. The passage 37 terminates at a seat 41 having an electromagnetic valve 42 normally engaging against it under bias of a strong spring 43 within the neck 44 of a solenoid casing 45 containing a solenoid 46 capable of withdrawing a magnetic core 47 and its valve 42 when this solenoid is energized, as best seen in Figure 7.

In order to effect operation of the brakes by means of this invention that constitutes a substantially automatic emergency stop brake system, an electric circuit is included that derives current from a current source 48. From this source, which may be a battery, a lead 49 goes to ground or the frame of the car at 50, while from the opposite pole of the source, a lead 51 extends through fire wall 20 to the key operated lock 52 receiving key 53, and from this lock extends a continuing lead 54 to solenoid casing 45 and solenoid 46. In addition, the brake lever 13 has a ground connection 55 at 56 or to the frame of the car, and also upon the foot board 10 is mounted a stationary contact 57 beneath brake pedal 11 and having a lead 58 extending to solenoid 46, the contact being insulated from surrounding objects. The arrangement is such that when the brake pedal is depressed as shown in Figure 6 by the operator's foot 12, the pedal is brought into active contact with stationary contact 57 secured in place upon insulator 59 and closes the circuit of current source 48 through the pedal, contact 57, lead 58, solenoid 46, lead 54, lock and key 52, 53, lead 51, battery 48, lead 49 and ground connection 50 and 56, lead 55 and brake pedal 11, thus completing the entire circuit.

The immediate result of thus closing the circuit is that the core 47 is drawn into the solenoid, opening valve 42, so that pressure fluid from container or cylinder 28 rises up as shown in Figure 7 through passages 35 and 37, raising ball 38 and up through passage 60 into tube 19, and through this to T17 and pipe 18 to the front and rear brakes through brake pipes 25 and 24 by way of T23. This sets the brakes instantly, even if the master cylinder 15 fails to release fluid to pipe 18 and the brakes. Releasing the brake pedal naturally cuts off supply of pressure fluid from cylinder 28 to the brake system including pipes 16, 18, 24 and 25 and valve 15, and the circuit of source is open and inactive until again required to operate by extreme operation of the brake pedal 11 as already described. The invention thus forms a safety operating means for the brake and a means for renewing the supply of brake fluid as well.

In Figure 4, the contact 57 is held between insulators 59, 61 by nut 62 screwed up on threaded neck 63 of this contact.

Manifestly, variations may be resorted to, and parts and features may be modified or used without others within the scope of the appended claim.

Having now fully described my invention, I claim:

An automatic hydraulic brake system for an automobile, including hydraulic brakes for at least two wheels thereof, pipe means leading to the brakes, a master cylinder connected to the pipe means and a pressure supply pipe also connected to said pipe means for communicating pressure liquid to said pipe means to operate said brakes, a foot pedal mounted to control said master cylinder and cause flow of hydraulic pressure fluid from said master cylinder to said brakes through said pipe means upon depression of said foot pedal, a brake liquid container mounted upon the automobile for containing a quantity of brake liquid with inert gas under pressure above and in contact with the liquid, an electrically operated valve device connected to the upper end of the container in effective position to control egress of pressure liquid therefrom, a source of electric current connected to said valve device, an electric contact adjacent to the foot pedal in position to close the circuit of said source and open the valve of said device upon over travel of said foot pedal beyond normal operation thereof for controlling the brakes, and a depending tube in said container upwardly connected to said pressure supply pipe through said electrically operated valve device and extending downwardly into and below the upper level of the liquid in said container for supplying pressure liquid therefrom to the brakes when said valve device is operated.

References Cited in the file of this patent
UNITED STATES PATENTS

| | | |
|---|---|---|
| 2,069,578 | Eaton | Feb. 2, 1937 |
| 2,373,272 | Stelzer | Apr. 10, 1945 |

FOREIGN PATENTS

| | | |
|---|---|---|
| 945,292 | France | Nov. 22, 1948 |
| 447,829 | Great Britain | May 19, 1936 |